(12) United States Patent
Gaedeken et al.

(10) Patent No.: US 7,180,904 B2
(45) Date of Patent: Feb. 20, 2007

(54) INTERFACE LINK LAYER DEVICE TO BUILD A DISTRIBUTED NETWORK

(75) Inventors: Gralf Gaedeken, Weinsberg (DE); Peter Buchner, Kirchheim/Teck (DE); Gerd Spalink, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 995 days.

(21) Appl. No.: 09/751,882

(22) Filed: Dec. 29, 2000

(65) Prior Publication Data
US 2001/0026557 A1    Oct. 4, 2001

(30) Foreign Application Priority Data
Dec. 30, 1999 (EP) ................................. 99126221

(51) Int. Cl.
H04J 3/00 (2006.01)
H04J 3/16 (2006.01)
H04J 3/22 (2006.01)

(52) U.S. Cl. ...................... 370/442; 370/469
(58) Field of Classification Search ................ 370/442, 370/356, 493, 389–397, 458, 473–474, 401, 370/410, 420, 463–465, 282, 436, 486, 487, 370/412; 710/62, 305, 15, 129; 379/93.09, 379/93.17; 713/300, 400; 709/227, 228, 709/249; 345/620; 348/564; 358/1.15
See application file for complete search history.

(56) References Cited
U.S. PATENT DOCUMENTS 4,228,498 A * 10/1980 Moshier .................. 710/301
4,926,422 A * 5/1990 Alaria et al. ............. 370/323
5,452,291 A 9/1995 Eisenhandler et al.
5,627,836 A * 5/1997 Conoscenti et al. ...... 370/397

(Continued)

FOREIGN PATENT DOCUMENTS
EP    0 835 037    4/1998

(Continued)

OTHER PUBLICATIONS

ETSI SMG3 Plenary Meetings #6 & #7, CRs to 3G Work Item GPRS, Nov. 29-Dec. 3, 1999 & Dec. 13-15, 1999.*

(Continued)

*Primary Examiner*—Chi Pham
*Assistant Examiner*—Prenell Jones
(74) *Attorney, Agent, or Firm*—Oblon, Spivak, McClelland, Maier & Neustadt, P.C.

(57) ABSTRACT

An interface link layer device of an interface which allows the interconnection of different networks to build a distributed network, The interface link layer routes complete data packets directly to another interface link layer device that serves the destination via uplink to accept a data packet from a first data bus that has a predetermined destination on a second data bus and to transmit the data packet via a transmission path to interface link layer device. The interface link layer also using downlink to output data packets received via the transmission path from another interface link layer device to a predetermined destination on the first data bus. Further, the interface link layer device is configured such that not all packets have to be transmitted via the interface on basis of an appropriate acknowledge code and response packet generation included in the interface link layer device.

13 Claims, 12 Drawing Sheets

U.S. PATENT DOCUMENTS

| | | | |
|---|---|---|---|
| 5,668,810 A * | 9/1997 | Cannella, Jr. | 370/392 |
| 5,768,539 A * | 6/1998 | Metz et al. | 709/249 |
| 5,847,771 A * | 12/1998 | Cloutier et al. | 348/564 |
| 6,014,381 A * | 1/2000 | Troxel et al. | 370/395.52 |
| 6,032,261 A * | 2/2000 | Hulyalkar | 713/400 |
| 6,081,533 A * | 6/2000 | Laubach et al. | 370/421 |
| 6,122,255 A * | 9/2000 | Bartholomew et al. | 370/237 |
| 6,202,103 B1 * | 3/2001 | Vonbank et al. | 710/15 |
| 6,377,276 B1 * | 4/2002 | Ludtke | 345/620 |
| 6,411,276 B1 * | 6/2002 | Braun et al. | 345/156 |
| 6,477,179 B1 * | 11/2002 | Fujii et al. | 370/466 |
| 6,553,440 B1 * | 4/2003 | Ikegaya | 710/62 |
| 6,631,415 B1 * | 10/2003 | James et al. | 709/227 |
| 6,747,979 B1 * | 6/2004 | Banks et al. | 370/401 |
| 6,751,221 B1 * | 6/2004 | Saito et al. | 370/392 |
| 6,754,185 B1 * | 6/2004 | Banerjee et al. | 370/282 |

FOREIGN PATENT DOCUMENTS

| | | |
|---|---|---|
| EP | 0 848 568 | 6/1998 |
| WO | WO 93 06670 | 4/1993 |
| WO | WO 98 47267 | 10/1998 |

OTHER PUBLICATIONS

Krusch, Power Nodes based on PLC Devices, PCD Conference, Sep. 10, 1998, pp. 1-12.*

* cited by examiner

INTERFACE LINK LAYER DEVICE TO BUILD A DISTRIBUTED NETWORK

The present invention relates to an interface link layer device which builds the core of an interface portal of an interface to which a network bus can be connected for the purpose of building a distributed network by at least one other network bus which is respectively connected to another interface portal of the same interface.

FIG. 16 shows a coaxial interface between two IEEE1394 serial bus systems which is existing according to the prior art and for example described in the EP 0 848 568 A1 in a similar manner. An IEEE1394 serial bus 32 with three IEEE1394 serial bus nodes 36 is connected to a first coaxial interface portal 31 which communicates via a coaxial interface, i. e. a coaxial cable 33, with a second coaxial interface portal 34 to which a second IEEE1394 serial bus 35 is connected which builds a network with two further IEEE1394 serial bus nodes 37. Each of the IEEE1394 serial bus nodes 36 has a different node identifier as well as each of the further IEEE1394 serial bus nodes 37. Furtheron, each of the first and second IEEE1394 serial busses 32 and 35 has a different bus identifier. The node identifiers and the bus identifiers are assigned according to the IEEE1394 standard. Therewith, the combination of node identifier and bus identifier assigns a unique identifier to each of the serial bus nodes, even if one of the serial bus nodes 36 and one of the further serial bus nodes 37 has the same node identifier. Both IEEE1394 serial bus systems are independent from each other, but they can communicate through the coaxial interface portals and the coaxial interface.

FIG. 17 shows a multiportal system in which three interface portals 31, 34 and 38 are connected to one coaxial cable. Each of the interface portals 31, 34 and 38 is connected to an IEEE1394 serial bus having a different bus identifier.

As mentioned above, such systems are described in EP 0 848 568 A1 according to which each interface portal is built by a RF/1394 converter that is connected to a coaxial cable on one side and to an IEEE1394 bus on the other side. Said RF/1394 converter converts all incoming data from the IEEE1394 bus into an RF-signal output to the coaxial cable and vice versa converts all incoming RF-signals into data packets output to the connected IEEE1394 serial bus. To fulfill this task the RF/1394 converter basically comprises a RF-modulator/demodulator, a link layer device and an IEEE1394 physical layer device. Since in this case in the uplink channel basically all data packets received on the IEEE1394 serial bus are just set into another format and transmitted as RF-signal on a coaxial cable and vice versa in the downlink channel all incoming RF-signals are converted into data packets output to the IEEE1394 serial bus the link layer device has not to fulfill complicated tasks, but it only secures the timing requirements for the IEEE1394 serial bus.

However, according to this prior art many resources are wasted, since all data packets that are available as RF-signals on the coaxial cable as well as all data packets that are present on any one of the IEEE1394 serial busses are distributed within the whole network.

Therefore, it is the object of the present invention to provide an interface link layer device that enables the interconnection of different networks to one distributed network while saving resources on said network.

Therefore, an interface link layer device according to the present invention that is connected to a first data bus and via a transmission path to at least one other interface link layer device that is respectively connected to a respective second data bus is characterized by uplink means to accept a data packet having a predetermined destination different to the interface link layer device itself from the first data bus and to transmit it via said transmission path to one of said other interface link layer devices that is serving said predetermined destination, and downlink means to output a data packet directly received via said transmission path from one of said at least one other interface link layer devices to a predetermined destination on the first data bus.

This interface link layer device according to the present invention is defined in independent claim 1. Preferred embodiments thereof are respectively defined in the dependent subclaims 2 to 33.

Therewith, according to the present invention every data bus that builds a part of a distributed network is connected with an interface portal that comprises as its core an interface link layer device according to the present invention that directly communicates with all other interface link layer devices that are working according to the present invention and that build respectively the core of a respective interface portal respectively connected to a data bus building a respective other part of said distributed network. With such a configuration according to the present invention a data packet having a certain destination identifier is only delivered into such parts of the distributed network that comprise a receiver of this data packet. Such a distribution is preferably conducted on basis of the destination identifier, i. e. the destination identifier comprises not only the node identifier of the respective destination node, but also the parts of the distributed network in which said respective node is located, e. g. a bus identifier of the network bus serving said part of the distributed network.

Therewith, this inventive method which is defined in independent claim 34 is applicable to a distributed network that is set up according to the present invention so that data channels are set up from every part of the distributed network to every other part thereof to allow a communication from one part of the distribution network to a predetermined other part thereof that is defined in independent claim 35. A preferred embodiment of such a distributed network is defined in dependent claim 36.

Preferably, the present invention is used in an environment as described in the EP 0 848 568 A1, i. e. interconnects one or more separate IEEE1394 serial busses via coaxial interfaces, but it is also applicable to any other distributed network that is build through the interconnection of several individual networks respectively distributing data packets according to a predetermined standard to one distributed network. Of course, the individual networks need not all to work according to the same standard, i.e. the interface build with interface link layer devices according to the present invention can also interconnect networks working according to different standards.

The present invention and its embodiments will be better understood from a detailed description of an exemplary embodiment thereof taken in conjunction with the accompanying drawings, wherein FIG. 1 shows an interface link layer device according to a preferred embodiment of the present invention;

Although the interface link layer device according to the present invention also builds the core of a respective interface portal that connects a network bus to an interface of a distributed network, for the sake of simplicity the respective physical layer devices interconnected inbetween the interface link layer device and the respective physical network bus and transmission path are omitted in the description.

Furtheron, the following description refers only to features that are not present in standard link layer devices. Of course, the interface link layer devices according to the present invention might also include the standard featurs, e.g. according to the IEEE1394 standard, that are not mentioned in the following. For example, the interface link layer device according to the present invention might be adapted to accept asynchronous packets with a destination identifier that is equal to the node identifier of the NODE_IDS register within its control and status registers as defined in the IEEE1394 specification, i.e. asynchronous packets that are adressed to the interface link layer device itself, and might also be adapted to insert asynchronous packets on its IEEE1394 bus, e. g. as response to such packets addressed to the interface link layer device itself.

The exemplary embodiment described in the following shows the connection of two or more IEEE1394 serial busses 2, 5 by a coaxial interface, i. e. by a coaxial cable 3. Such a system can for example be used in a home network environment in which individual IEEE1394 serial bus systems are installed in different rooms of a house and are interconnected via existing coaxial cables so that for example a video tape reproduced by a video recorder in one room of the house can be watched on a television set in another room of said house, as it is described in the EP 0 848 568 A1. In contrast to the system described in this document according to the present invention the data packets carrying said video film are only transmitted to a predetermined television set in a predetermined room, i. e. to a predetermined node within a predetermined part of the distributed network, and not broadcasted through the whole network.

Figure 1:
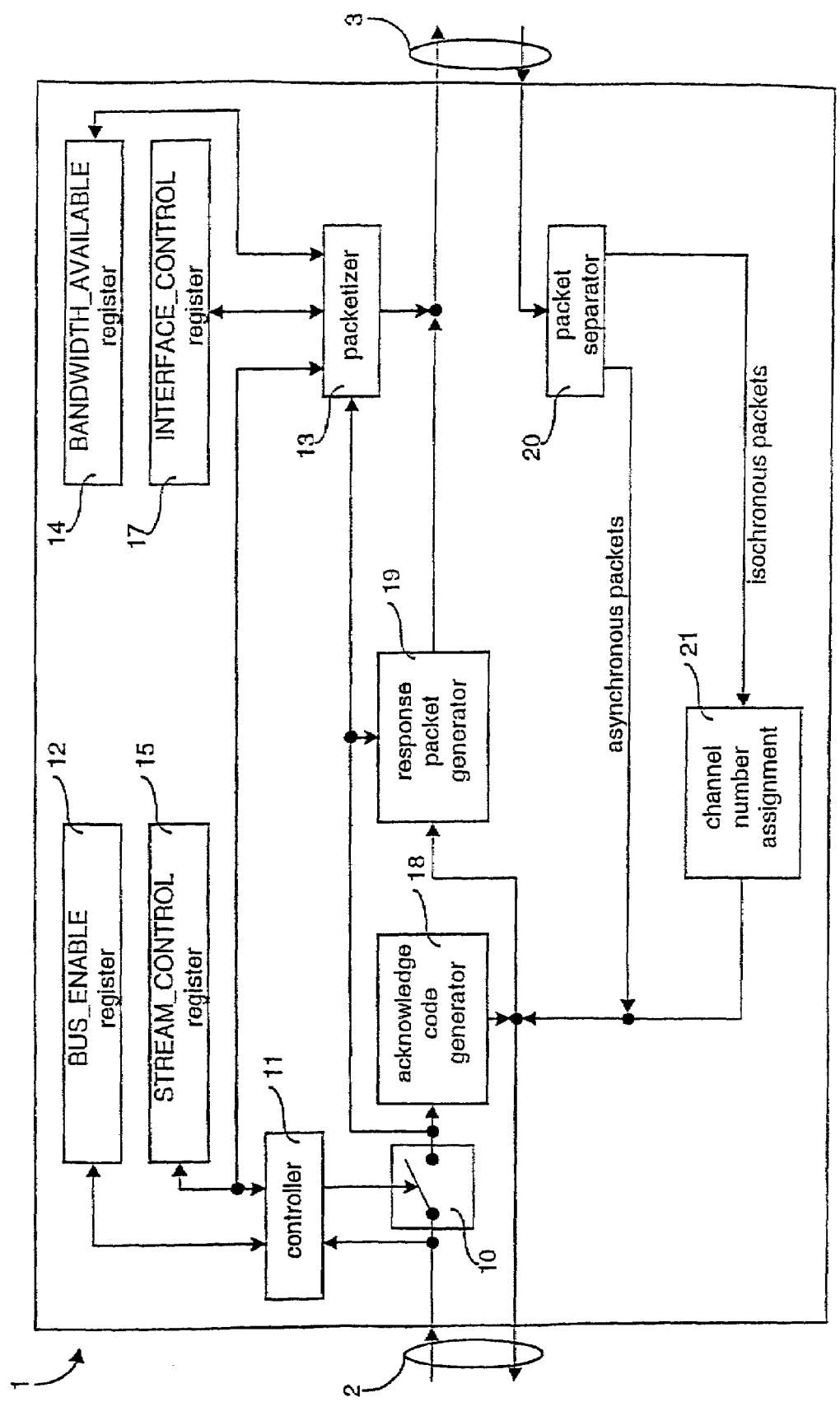

To facilitate this an interface link layer device according to a preferred embodiment of the present invention which is shown in FIG. 1 comprises an uplink section, a downlink section and an acknowledge/response section.

The uplink section accepts data packets having predetermined destinations which are different to the interface link layer device 1 itself, i.e. the interface portal comprising the interface link layer device 1, from a first data bus 2 and to transmit those data packets via a transmission path 3, that might be a coaxial cable, to predetermined other interface link layer devices 4 respectively serving one of said predetermined destinations. To filter such data packets the uplink section comprises a first register 12 which stores all allowed predetermined destinations, i. e. all destination identifiers of devices that can be reached through the coaxial cable and that are connected to another part of the distributed network, and a second register 15 which stores all data channel numbers set-up inbetween two nodes of the distributed network, i.e. inbetween two nodes located in different parts of the distributed network.

Preferably not the destination identifiers themself, but only the bus identifier is stored and checked that defines a bus building one other part of the distributed network.

A control section 11 monitors all asynchronous data packets that are received from the IEEE1394 serial bus 2, compares their bus and/or node identifier with the bus and/or node identifiers stored in the first register 12 and opens or closes a switch 10 to lead an incoming asynchronous data packet to the further processing stages or to discard it depending on whether or not the destination identifier of the incoming packet matches with a destination identifier stored in the first register 12. Furtheron, the control section monitors all isochronous data packets that are received from the IEEE1394 serial bus 2, compares their channel number with the channel number stored in the second register 15 and opens or closes said switch 10 to lead an incoming isochronous data packet to the further processing stages or to discard it depending on whether or not the channel number of the incoming packet matches with a channel number stored in the second register 15.

The first register 12 is preferably a BUS_ENABLE register which is a bitmap that represents whether or not transaction requests and responses are forwarded by the interface. For example, if bit 2 is set to one in the BUS_ENABLE register, the interface link layer is enabled to accept asynchronous data packets with a bus identifier of 2. If this bit is not set, the interface link layer device denies the packet as described above. The second register 15 is preferably a STREAM_CONTROL register which is similar organized as the first register 12 and has a corresponding function. Of course, as mentioned above, independently from this invention the interface link layer device always accepts data packets which destination identifier matches with its own node identifier, as every standard interface link layer device does.

Figure 2:
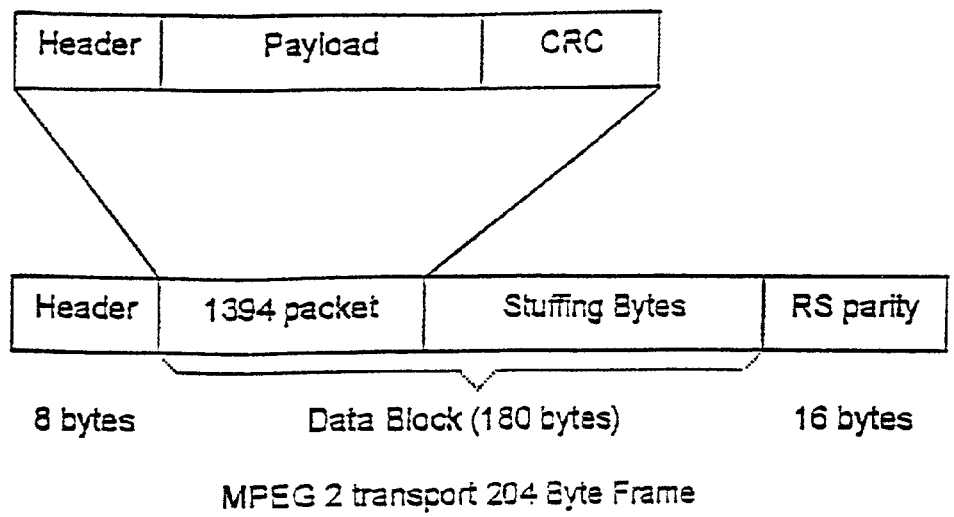
FIG. 2 shows the inserting of an IEEE1394 serial bus packet with less than 180 bytes into a 204 byte MPEG 2 frame.

The accepted IEEE1394 packets which should be transmitted via the coaxial cable to another part of the network are received by a packetizer 13 that repacks them into a data format suitable for the transmission channel, i. e. the transmission via the coaxial cable. Such a repacking is shown in detail in the following in connection with FIGS. 2 and 3. FIG. 2 shows the inserting of an IEEE1394 serial bus packet with a maximum of 180 bytes into a 204 byte frame according to the MPEG 2 standard. Since it is possible to transmit a data block of 180 bytes in the first packet of a section according to the MPEG 2 standard, the IEEE1394 serial bus packet including its header, payload and cyclic redundancy code CRC is inserted as data block or part of the data block into one 204 byte frame according to the MPEG 2 standard. If the whole IEEE1394 serial bus packet comprises less than 180 bytes, i. e. less than the data block of the MPEG 2 frame, some stuff bytes will be added to fill this datablock. Then the whole MPEG 2 frame including its header, its data block which comprises the header, the payload and the cyclic redundancy code of the IEEE1394 serial bus packet and some stuff bytes, as well as a 16 byte Reed Solomon parity or another error detection/correction code is transmitted via the coaxial cable.

Figure 3:
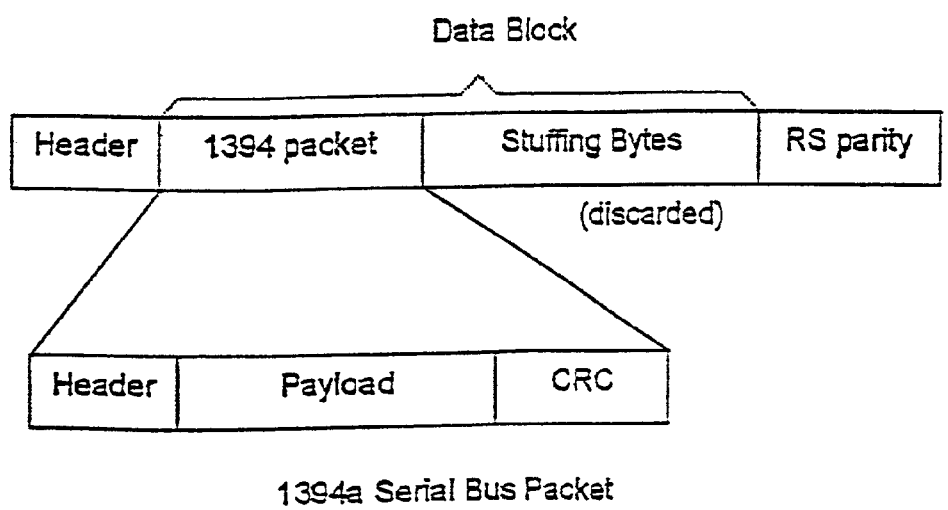
FIG. 3 shows the separating of an IEEE1394 serial bus packet with less than 180 bytes from a 204 byte MPEG 2 frame.

If, on the other hand a large serial bus packet should be transmitted over the coaxial cable 3 which has more than 180 bytes in total, a fragmentation has to be performed before it is transmitted over the coaxial cable 3. Such a fragmentation is shown in FIG. 3. FIG. 3 shows an example in which an IEEE1394 serial bus packet of 732 bytes in total, i. e. including header, payload and cyclic redundancy code is transmitted within four 204 byte frames according to the MPEG 2 standard on the coaxial cable which each consists of a 8 byte header, a 180 byte data block and a 16 byte Reed Solomon parity.

As can be seen in FIG. 1, the packetizer 13 is connected to said STREAM_CONTROL register 15 which stores beside the channel number of each isochronous channel the payload which defines the maximum number of quadlets that may be transmitted in a single isochronous packet and which corresponds to the data rate. This data is used by the packetizer 13 to properly set-up an isochronous channel according to the MPEG 2 standard on the coaxial cable 3. Furtheron, the packetizer 13 is connected to a third register, namely a BANDWIDTH_AVAILABLE register which provides the available bandwidth on the coaxial cable 3 so that the packetizer 13 can check whether there is enough-bandwidth in case a new isochronous channel should be set-up or an asynchronous packet should be transmitted.

A further element of the uplink section is a fourth register 17, namely an INTERFACE_CONTROL register which includes the node identifier of the interface link layer device connected to the other side of the distributed network, i.e. the other side of the coaxial cable 3, and an Enable Bit to allow the direct routing of asynchronous packets through the coaxial cable 3.

The data packets to be output on the downlink channel(s) of the IEEE1394 serial bus 2 through the interface link layer device 1 are received through the connected transmission channel 3 from another interface link layer device 4 by the downlink section of the interface link layer device 1. Within said downlink section said data packets get repacked by a packet separator 20 into the IEEE1394 format which has a reverse operation in comparison with the packetizer 13 of the uplink section.

Figure 4:
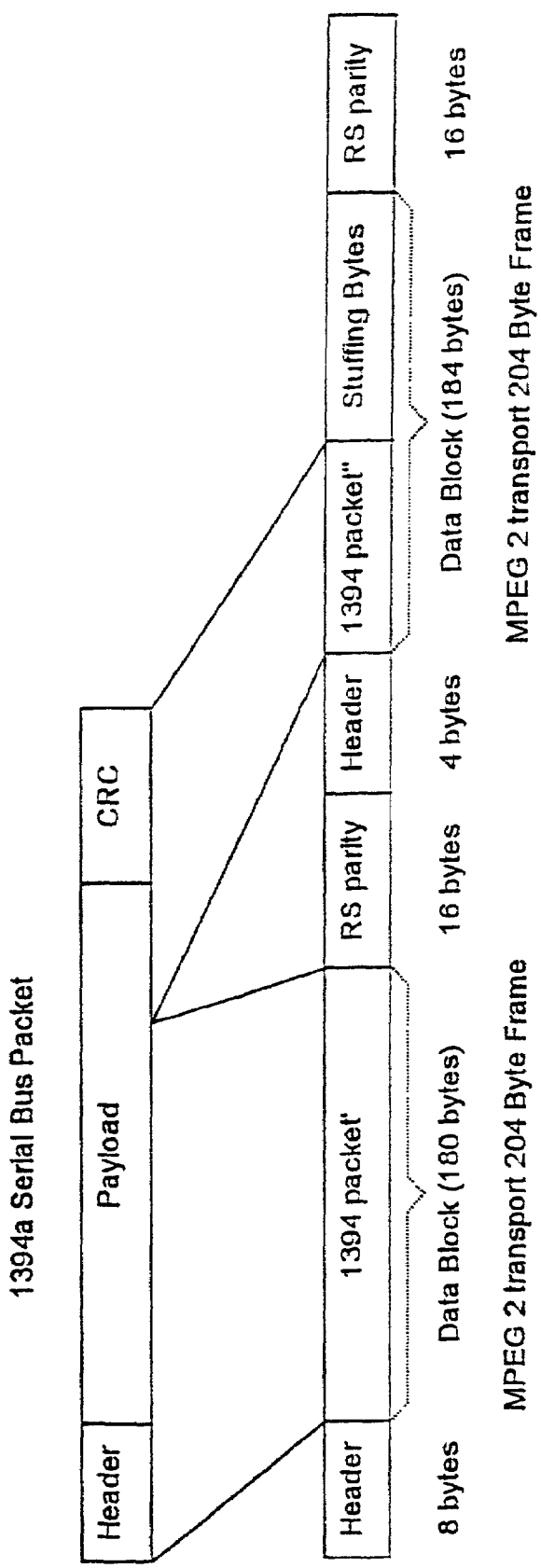
FIG. 4 shows the fragmentation of a large serial bus packet before the transmission over a coaxial cable.
Figure 5:
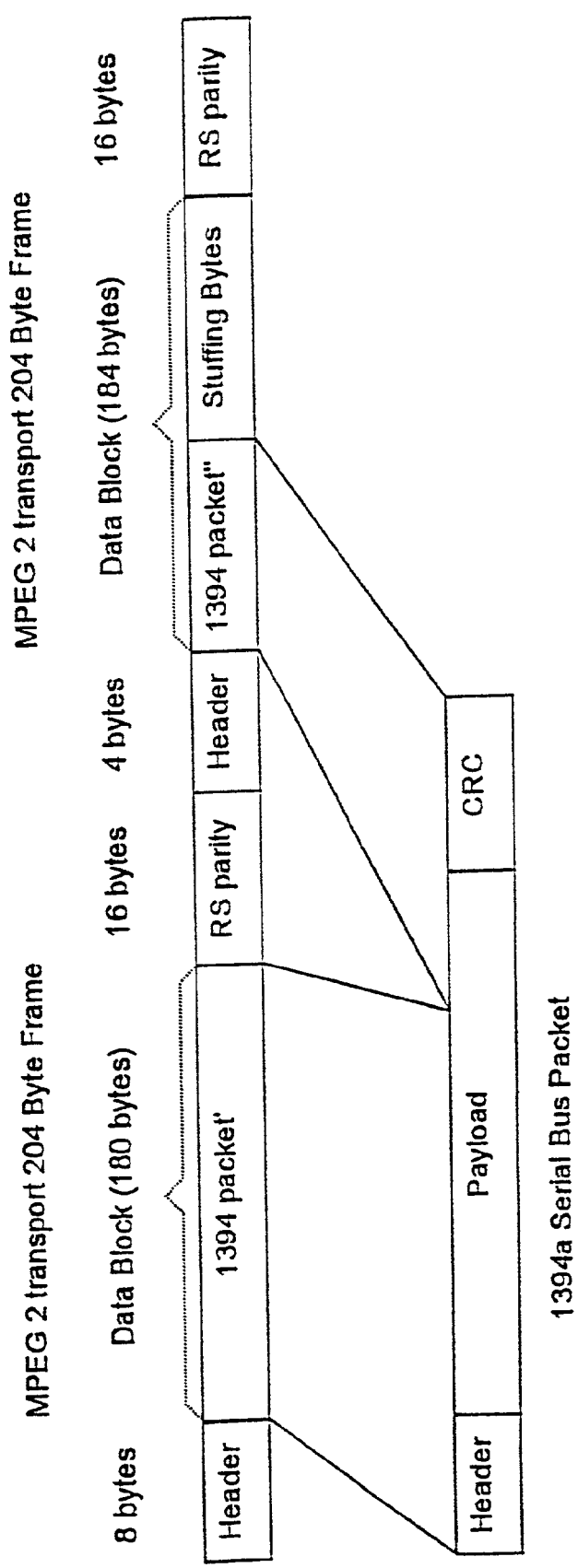
FIG. 5 shows the defragmentation of a large serial bus packet after its transmission over the coaxial cable.

As it is shown in FIG. 4 for the case that an IEEE1394 serial bus packet with less than 188 bytes gets separated from an incoming MPEG 2 frame which has 204 bytes the packet separator 20 takes the header, the payload and the cyclic redundancy code which belong to the IEEE1394 serial bus packet from the data block of the MPEG 2 frame and discards the stuff bytes which have been added by the packetizer 13 of the other interface link layer device 4. The case that the IEEE1394 serial bus packet has a length of more than 188 bytes and needs a defragmentation after transmitting over the coaxial cable is shown in FIG. 5. In the shown case the IEEE1394 serial bus packet has a total length of 752 bytes and is therefore transmitted in the data blocks of 4 MPEG 2 frames. The data blocks of these 4 frames carry the header, the payload and the cyclic redundancy code of the IEEE1394 serial bus packet which gets assembled in the packet separator 20 and distributed via the downlink channel(s) of the IEEE1394 serial bus 2.

Since the packetizer 13 adds stuff bytes to fill each data block of the 204 byte MPEG 2 frame and in case that there are no IEEE1394 packets to transmit via the coaxial cable a data block of the 204 byte MPEG frame consists only of stuff bytes the packet separator 20 receives a constant data stream from which the IEEE1394 packets get separated. As described above, divided IEEE1394 packets will be put together again and then, if not addressed to the outbound portal, i. e. the interface link layer device 1 itself, will be transmitted by the downlink section within the interface link layer device 1 to the connected IEEE1394 serial bus 2 to the destination node.

If a predetermined bit in the header of a frame indicates a transport error the interface link layer device discards the complete packet. Also, if an error occurs during transmission via the coaxial cable the packet will be discarded. In these cases a device which waits for said packet, since it has requested a certain transaction, generates a split timeout error which is an indicator that the certain transaction should be requested again. The minimum timeout value for a split timeout is 100 ms.

As described above, in case of asynchronous packets the header is necessary to identify the source, the destination and the transaction type of the packet. For isochronous packets, on the other hand, there is no guarantee to be transmitted within the same channel number from the outbound portal. Therefore, the downlink section comprises a channel number assignment unit 21 that assigns a new channel number to isochronous packets which origin in a channel of the data bus that hosts the originator of said packets which channel number is already occupied for another data stream within the IEEE1394 serial bus 2 that is connected to the interface link layer device 1 and serves the receiver of said packets.

As described hereinafter in connection with FIGS. 6 to 9 the interface link layer device according to the present invention does not just forward incoming acknowledge packets to their destination, but sets up an own acknowledgement and response strategy. Therefore, acknowledge packets that are received via the IEEE1394 serial bus 2 are not just forwarded through the coaxial cable 3 to the interface link layer device connected to the network bus to which the destination device is connected, but the incoming acknowledge packet gets analysed by said interface link layer device which then decides which kind of action, i. e. acknowledgement and/or response is necessary to which device.

To properly set-up an acknowledge and response strategy the acknowledge/response section of the interface link layer device 1 according to the present invention comprises an acknowledge code generator 18 that serves the inbound behavior and a response packet generator 19 that serves the outbound behavior.

The acknowledge code generator 18 receives all accepted data packets through the uplink channel(s) of the IEEE1394 serial bus 2 and generates appropriate acknowledge codes to be output on the downlink channel(s) of the IEEE1394 serial bus 2. Therefore, according to the present invention, an acknowledge code is not only generated when a packet which is to be transmitted to another part of the distributed network, i. e. another IEEE1394 serial bus, through the coaxial cable 3 reaches its destination, but also when such a packet reaches the inbound portal, i. e. the interface link layer device 1, of the transmission channel, i. e. the coaxial cable 3.

The response packet generator 19 that monitors the uplink and downlink channel(s) of the connected IEEE1394 serial bus 2 generates an appropriate response packet to be output with an appropriate speed to a particular destination device via the coaxial cable 3 in case a request was transmitted to the connected IEEE1394 serial bus 2 and a corresponding acknowledge code is received from the connected IEEE1394 serial bus 2.

As mentioned above, the acknowledge code generator 18 sends an acknowledge to the originator of a packet received via the connected IEEE1394 serial bus 2 for each accepted asynchronous packet that is either addressed to the node controller of the interface link layer device 1 or to a node on the other side of the coaxial cable 3, e.g. a node connected to another IEEE1394 serial bus 5 within the distributed network. The following table 1 gives an overview about the outbound behavior of the interface link layer device concerning the acknowledge. A "-" sign within the table indicates that the respective content does not matter, but differs from 3F or 3FF. 3F and 3FF are hexadecimal values which are reserved within the IEEE1394 standard for special purposes. The Enable Bit is located in the INTERFACE_CONTROL register 17, as stated above.

| | | | Destination | |
|---|---|---|---|---|
| Enable Bit | Bus ID | PHY ID | Source Bus ID | Action |
| — | 3FF or Node_IDS.bus_ID | — | — | Local packet. Acknowledge per IEEE 1394-1995 standard. |
| 0 | Neither 3FF nor Node_IDS.bus_ID | — | — | Routing disabled, Ignore packet, no Acknowledge. |
| 1 | — | — | 3FF | Unable to route. Ignore packet, no acknowledge. |
| 1 | 3FF | 3F | Not 3FF | Global broadcast. Forward packet, no acknowledge. |
| 1 | Neither 3FF nor Node_IDS.bus_ID | — | Node_IDS.bus_ID | Remote packet origination. Forward packet according to BUS_ENABLE, transmit ack_pending or ack_complete. |
| | | | Neither 3FF nor Node_IDS.bus_ID | Remote packet in transit. Forward packet and transmit ack_pending or ack_complete. |
| | | | All other combinations | Unable to route. Ignore packet, no acknowledge |

It can be seen that the generated acknowledge code depends on the destination identifier, the transaction code and the cyclic redundancy code of an incoming packet. If a received packet is a request and to be routed through the interface, the acknowledge code generator 18 always generates an acknowledge code that indicates a pending action, e. g. ack_pending, for the indicator of the request. In case of an error the acknowledge code generator 18 generates a data error acknowledgement, e. g. ack_data_error, and an acknowledgement that indicates a completed action will be generate in case the received packet is a response packet without any errors, e. g. ack_complete. This behavior of split transactions is necessary, since in most cases there would be no unified transaction possible over interfaces for time reasons, because the originator of a packet expects an acknowledge code for this packet within a certain time limit, e.g. 50 ms.

The outbound behavior, on the other hand, is controlled by the response packet generator 19. Every time an asynchronous packet, i.e. a request packet, was transmitted through the coaxial cable to a predetermined destination on the connected IEEE1394 serial bus the incoming corresponding acknowledge packet is received by the response packet generator 19 from the connected IEEE1394 serial bus 2 and it is decided whether or not an appropriate response is output via the coaxial cable 3 to the originator of a request that has triggered the acknowledge, as shown in the following table 2.

| Name (incoming acknowledgement) | Action |
|---|---|
| ack_complete | Request: Transmit the appropriate response packet. Response: No action. |
| ack_pending | |
| ack_busy_X | The bridge abandons retry attempts: |
| ack_busy_A | Request: Transmit the appropriate response packet. |
| ack_busy_B | Response: No action. |
| ack_data_error | Request: Transmit the appropriate response packet. |
| ack_type_error | Response: No action. |

Therefore, the response packet generator 19 monitors all accepted acknowledge packets that are incoming via the connected IEEE1394 serial bus 2 to provide an appropriate response packet as an asynchronous response packet for the originator of the request packet. Furtheron, the response packet generator 19 has to monitor all request packets output to the connected IEEE1394 serial bus 2. To monitor all incoming and outgoing packets the response packet generator 19 stores different components of the asynchronous packet header, e.g. the source and destination of a packet, the source as new destination and the destination as new source.

It can be seen that the appropriate response packet will only be generated by the response packet generator 19 if the asynchronous packet transmitted via the coaxial cable 3 to a predetermined destination on the connected IEEE1394 serial bus 2 was a write request and the response packet generator 19 received an acknowledge that indicates a completed action from the predetermined destination, i.e. the receiver of said request. For read requests and lock requests the receiver of the asynchronous packet has to create the appropriate response packet which will be forwarded by the other interface link layer device 4 through the coaxial cable 3 to the interface link layer device that is connected to the IEEE1394 serial bus serving the originator of the corresponding request packet.

FIGS. 6 to 9 respectively show an example in which a first IEEE1394 node 6 is connected via a first IEEE1394 serial bus 2 to a first interface link layer device 1 according to the present invention which is connected through a coaxial cable 3 to a second interface link layer device 4 according to the present invention that is connected to a second IEEE1394 serial bus 5 which serves a second IEEE1394 node 7.

Figure 6:
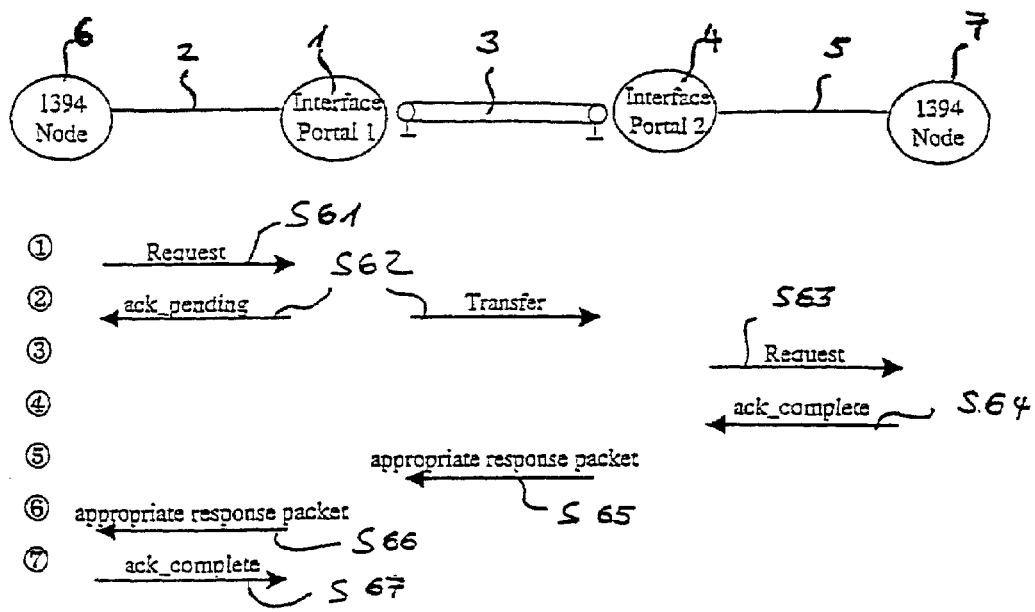
FIG. 6 shows the acknowledge handling for asynchronous packets according to a first example.

In the first example shown in FIG. 6, the first node 6 distributes in a first step S61 a request to the second node 7 on the first serial bus 2 it is connected to. Such a request is send as an asynchronous packet. In a second step S62 the first interface link layer device 1 receives that request and accepts it, since the identifier of the second node 7 is stored in its first register 12, i. e. the BUS_ENABLE register. Additionally, the acknowledge code generator 18 of the first interface link layer device 1 transmits an acknowledgement indicating a pending action, i.e. ack_pending, to the first node 6 and tranfers the request via the coaxial cable 3 to the second interface link layer device 4 according to the MPEG 2 standard. In a third step S63 the second interface link layer device 4 receives the request, repacks it with its packet separator 20 and transmits it via the connected second serial bus 5 to the second node 7. The second node 7 indicates in a fourth step S64 a completed action with an acknowledgement, i.e. ack_complete, directed to the requesting first node 6. This acknowledgement code is distributed on the second serial bus 5 which is connected to the second node 7. In the next fifth step S65 the second interface link layer device 4 receives and accepts the acknowledge packet from the second node 7, since its destination identifier is stored in its first register 12, i.e. its BUS_ENABLE register. The response packet generator 19 of the second interface link layer device 4 generates an appropriate response packet and transmits it via the coaxial cable 3 to the first interface link layer device 1 which distributes it after an appropriate repacking with its packet separator 20 to the first node 6 via the first serial bus 2 in a sixth step S66. Finally, in the seventh step S67, the first node 6 sends an completed action acknowledgement code to the second node 7 via the connected first serial bus 2 which is received and accepted by the first interface link layer device 1 which accepts and discards it and therewith finalizes the action.

Figure 7:
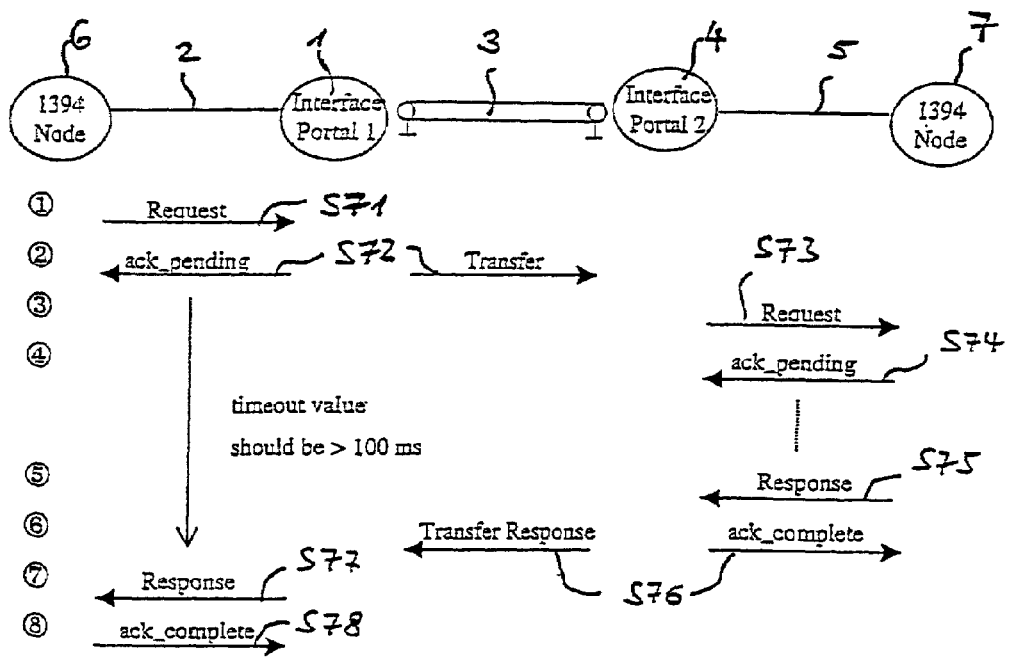
FIG. 7 shows the acknowledge handling for asynchronous packets according to a second example.

In the second example shown in FIG. 7, the first node 6 distributes in a first step S71 a request to the second node 7 on the first serial bus 2 it is connected to as an asynchronous packet. In a second step S72 the first interface link layer device 1 receives that request and accepts it, since the identifier of the second node 7 is stored in its first register 12, i. e. the BUS_ENABLE register. Additionally, the acknowledge code generator 18 of the first interface link layer device 1 transmits an acknowledgement indicating a pending action, i.e. ack_pending, to the first node 6 and tranfers the request via the coaxial cable 3 to the second interface link layer device 4 according to the MPEG 2 standard. In a third step S63 the second interface link layer device 4 receives the request, repacks it with its packet separator 20 and transmits it via the connected second serial bus 5 to the second node 7. The second node 7 indicates in a fourth step S74 a pending action with an acknowledgement, i.e. ack_pending, directed to the requesting first node 6. This acknowledgement code is distributed on the second serial bus 5 which is connected to the second node 7. Therafter, in a sixth step S76, the second node 7 generates a response to the request received in the third step S73 that is directed to the requesting first node 6. This response is distributed on the second serial bus 5 which is connected to the second node 7 and received and accepted by the second interface link layer device 4, since its destination identifier is stored in its first register 12, i.e. its BUS_ENABLE register. The acknowledge code generator 18 of the second interface link layer device 4 transmits an acknowledge code indicating a completed action, i.e ack_complete, to the second node, since the second interface link layer device has received the response without any errors. Since the response, which indicates a completed action, is no acknowledge code the second interface link layer device 4 transmits said packet after repacking by its packetizer 13 via the coaxial cable 3 to the first interface link layer device 1 which distributes it after an appropriate repacking with its packet separator 20 to the first node 6 via the first serial bus 2 in a seventh step S77. Finally, in the eighth step S78, the first node 6 sends an completed action acknowledgement code to the second node 7 via the connected first serial bus 2 which is received and accepted by the first interface link layer device 1 which accepts and discards it and therewith finalizes the action.

The timeout value of the first node 6 to wait from the received ack_pending acknowledgement to the response should be set >100 ms.

Figure 8:
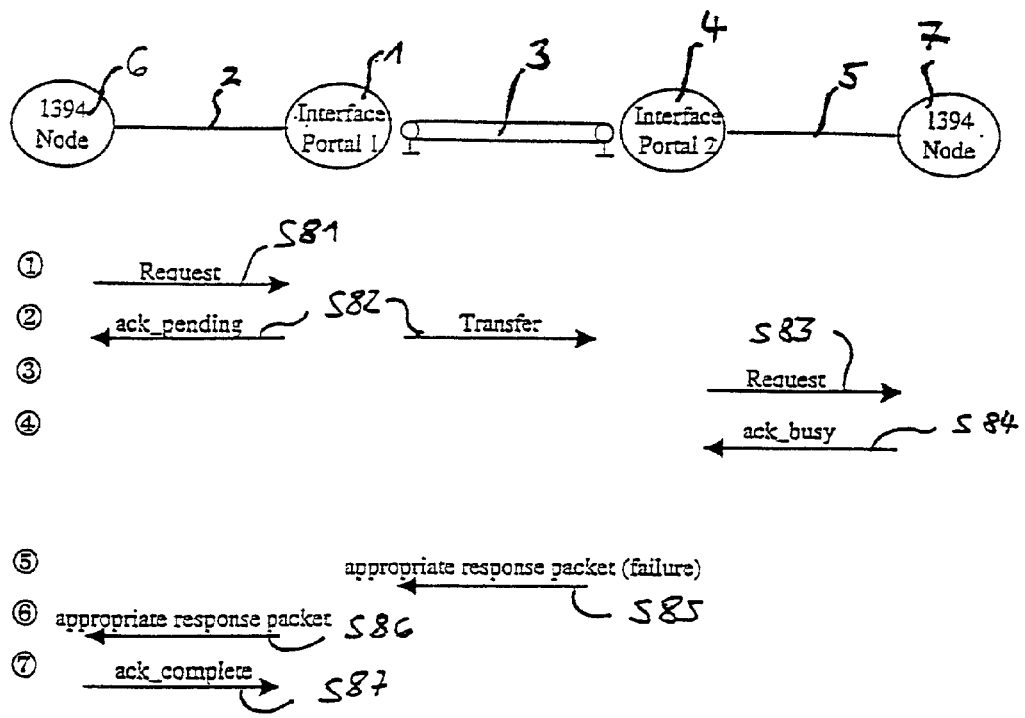
FIG. 8 shows the acknowledge handling for asynchronous packets according to a third example.

In the third example shown in FIG. 8, the first node 6 distributes in a first step S81 a request to the second node 7 on the first serial bus 2 it is connected to as an asynchronous packet. In a second step S82 the first interface link layer device 1 receives that request and accepts it, since the identifier of the second node 7 is stored in its first register 12, i. e. the BUS_ENABLE register. Additionally, the acknowledge code generator 18 of the first interface link layer device 1 transmits an acknowledgement indicating a pending action, i.e. ack_pending, to the first node 6 and tranfers the request via the coaxial cable 3 to the second interface link layer device 4 according to the MPEG 2 standard. In a third step S83 the second interface link layer device 4 receives the request, repacks it with its packet separator 20 and transmits it via the connected second serial bus 5 to the second node 7. The second node 7 indicates in a fourth step S84 that it is busy with an acknowledgement, i.e. ack_busy, directed to the requesting first node 6. This acknowledgement code is distributed on the second serial bus 5 which is connected to the second node 7. In the next fifth step S85 the second interface link layer device 4 receives and accepts the acknowledge packet from the second node 7, since its destination identifier is stored in its first register 12, i.e. its BUS_ENABLE register. The response packet generator 19 of the second interface link layer device 4 generates an appropriate response packet and transmits it via the coaxial cable 3 to the first interface link layer device 1 which distributes it after an appropriate repacking with its packet separator 20 to the first node 6 via the first serial bus 2 in a sixth step S86. Finally, in the seventh step S87, the first node 6 sends an completed action acknowledgement code to the second node 7 via the connected first serial bus 2 which is received and accepted by the first interface link layer device 1 which accepts and discards it and therewith finalizes the action.

Figure 9:
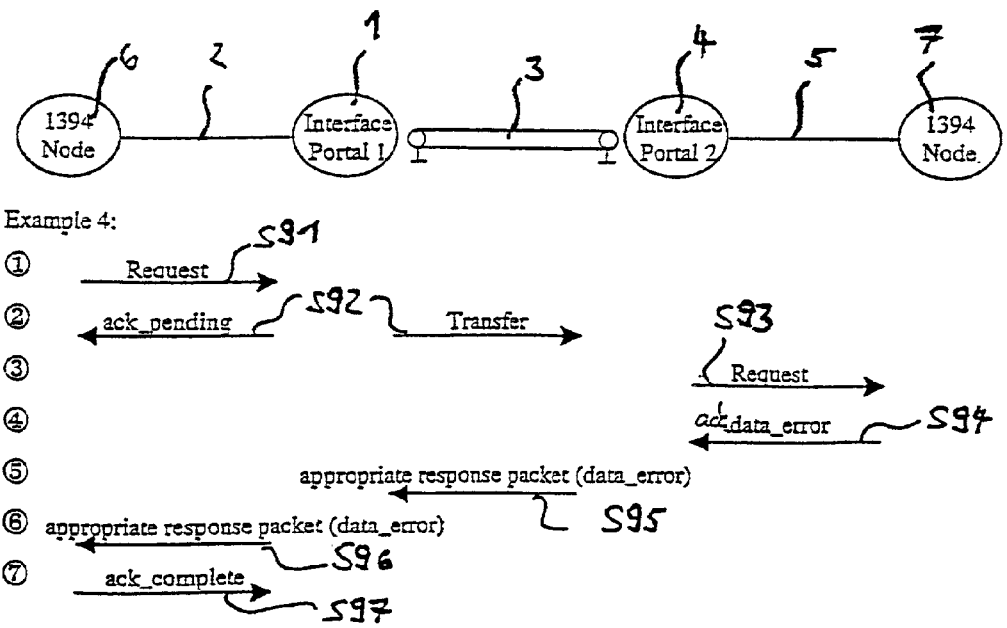
FIG. 9 shows the acknowledge handling for asynchronous packets according to a fourth example.

In the fourth example shown in FIG. 9, the first node 6 distributes in a first step S91 a request to the second node 7 on the first serial bus 2 it is connected to as an asynchronous packet. In a second step S92 the first interface link layer device 1 receives that request and accepts it, since the identifier of the second node 7 is stored in its first register 12, i. e. the BUS_ENABLE register. Additionally, the acknowledge code generator 18 of the first interface link layer device 1 transmits an acknowledgement indicating a pending action, i.e. ack_pending, to the first node 6 and tranfers the request via the coaxial cable 3 to the second interface link layer device 4 according to the MPEG 2 standard. In a third step S83 the second interface link layer device 4 receives the request, repacks it with its packet separator 20 and transmits it via the connected second serial bus 5 to the second node 7. The second node 7 indicates in a fourth step S84 a data error with an acknowledge code, i.e. ack_data_error, directed to the requesting first node 6. This acknowledgement code is distributed on the second serial bus 5 which is connected to the second node. In the next fifth step S85 the second interface link layer device 4 receives and accepts the acknowledge packet from the second node 7, since its destination identifier is stored in its first register 12, i.e. its BUS_ENABLE register. The response packet generator 19 of the second interface link layer device 4 generates an appropriate response packet and transmits it via the coaxial cable 3 to the first interface link layer device 1 which distributes it after an appropriate repacking with its packet separator 20 to the first node 6 via the first serial bus 2 in a sixth step S86. Finally, in the seventh step S87, the first node 6 sends an completed action acknowledgement code to the second node 7 via the connected first serial bus 2 which is received and accepted by the first interface link layer device 1 which accepts and discards it and therewith finalizes the action.

It can be seen that according to the present invention the interface link layer device which is connected to a respective IEEE1394 serial bus and a respective coaxial cable through respective physical layer devices provides accepted packets that should be transmitted via the interface as complete packets to the coaxial cable. Such a complete packet consists of the header, the data block and the cyclic redundancy codes. The transmission of the complete packet through the coaxial cable 3 is necessary, because the corresponding interface link layer device connected to another network bus of the distributed network needs the information of the packets for the transmission on said other serial bus. Furtheron, the interface link layer device according to the present invention introduced the concept that not all packets have to be transmitted via the interface, since an appropriate acknowledge code and response code generation of the interface link layer device itself is introduced.

Figure 10:
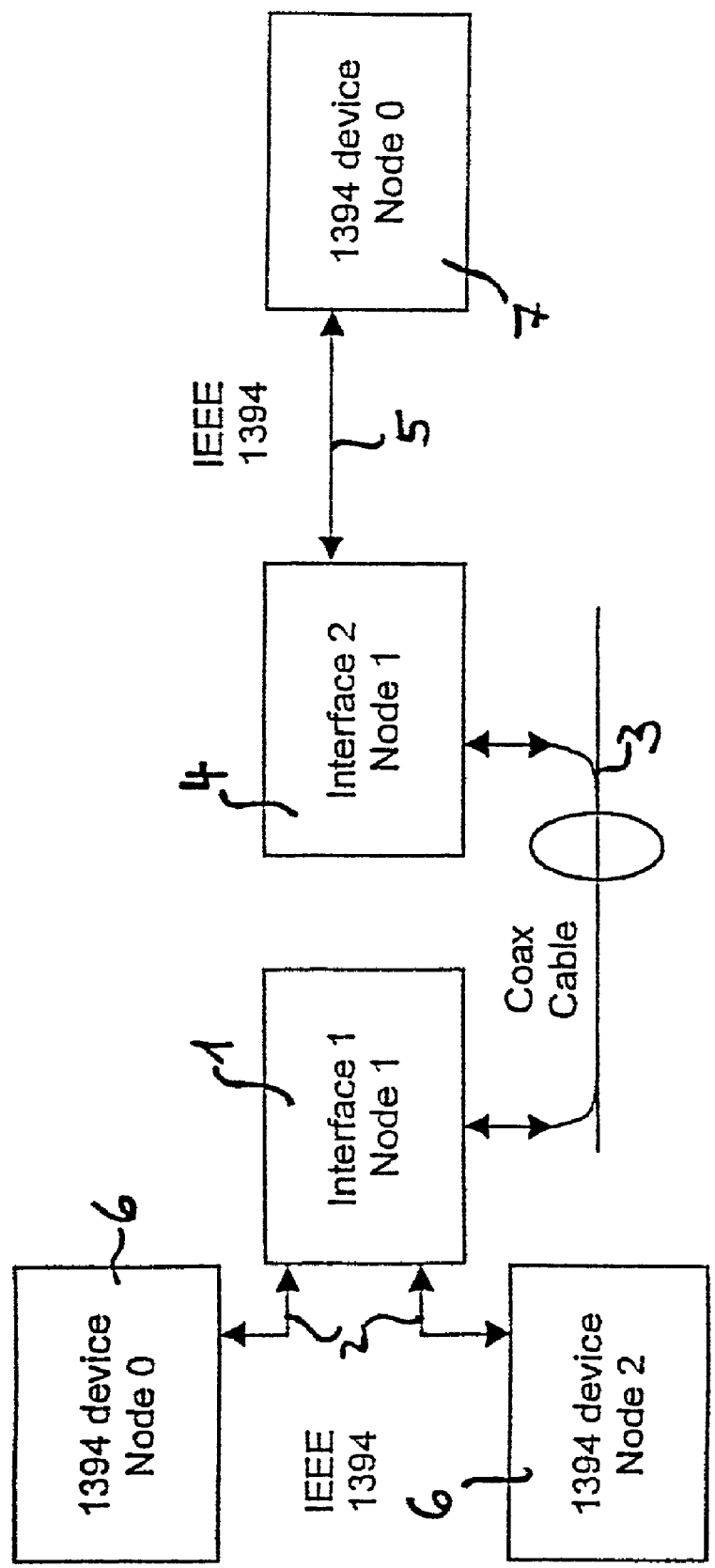
FIG. 10 shows a simplified distributed network using a coaxial cable.

Since according to the present invention not all, but only selected data packets are distributed via the coaxial interface it is in a special arrangement possible to "hide" the coaxial interface to the IEEE1394 bus to which it is connected. An example for such an arrangement is shown in FIG. 10.

Generally, such arrangements comprise one first IEEE1394 serial bus 2 which can have any number of controller nodes 6 connected. This is called the multi-device side. In the example shown in FIG. 10 there are two IEEE1394 serial bus nodes 6 and one interface link layer device 1 (which is also a node within the IEEE1394 system) connected to the first IEEE1394 serial bus 2.

Via a coaxial cable 3 and a second interface link layer device 4 there is connected a second IEEE1394 serial bus 5. According to this embodiment of the invention to "hide" the coaxial interface 3 to the first IEEE1394 bus 2 this second IEEE1394 serial bus 5 is allowed to have only one single IEEE1394 serial bus node 7 connected. This is called the single-device side.

To "hide" the coaxial interface 3 it is neccessary that a controller node 6 on the mulit-device side is not aware of the interface. This can be achieved since the interface link layer device 1 looks like the single IEEE1394 serial bus node 7 connected to the first interface link layer device 1 via the coaxial interface 3, the second interface link layer device 5 and the second IEEE1394 serial bus 5.

FIG. 10 shows also the node identifiers of all serial bus nodes connected to both IEEE1394 serial busses 2 and 5 which are automatically assigned after a bus reset. The multi-device side comprises two controller nodes 6, one has a node ID 0 and the other has a node ID 2. The first interface link layer device 1 connected to the first IEEE1394 serial bus 2 has a node ID 1. The single-device side is build by a controller node 7 having a node ID 0 and the second interface link layer device 4 having a node ID 1.

In order to make the communication work the destination node ID within asynchronous packets of a controller node 6 connected to the first IEEE1394 serial bus 2 to the single-device side has to be changed from the node ID of the first interface link layer device 1 on the multi-device side, 1 in FIG. 10, to the node ID of the single controller node 7 on the single device side, 0 in FIG. 10. The source node ID remains unchanged for this communication direction.

Further, in asynchronous packets from the single-device side to the multi-device side the source node ID has to be changed from the node ID of the single controller node 7, 0 in FIG. 10, to the node ID of the interface link layer device 1 on the multi-device side, 1 in FIG. 10. The destination ID remains unchanged for this communication direction.

A possible implementation can be realized by providing two additional registers within the second interface link layer device 4 of the single-device side. The first additional register stores the node ID of the first interface link layer device 1 on the multi-device side and the second additional register stores the node ID of the single controller node 7 on the single-device side. The second interface link layer device 4 has then to replace the destination node identifier before sending a packet to the second IEEE1394 serial bus 5 using the value of the second additional register and to replace the source node identifier using the value of the first register before sending a packet to the coaxial cable 3. In this implementation the first interface link layer device 1 connected to the multi-device side requires only the modification to forward packets directed to itself through the coaxial cable to the second interface link layer device, i.e. to forward packets with destination node identifiers that are identical to its own node identifier. Furthermore, the second interface link layer device 4 on the single-device side has to operate in a special mode, because it has to accept and forward packets with destination node identifiers that are not identical to its own node identifier.

Figure 11:
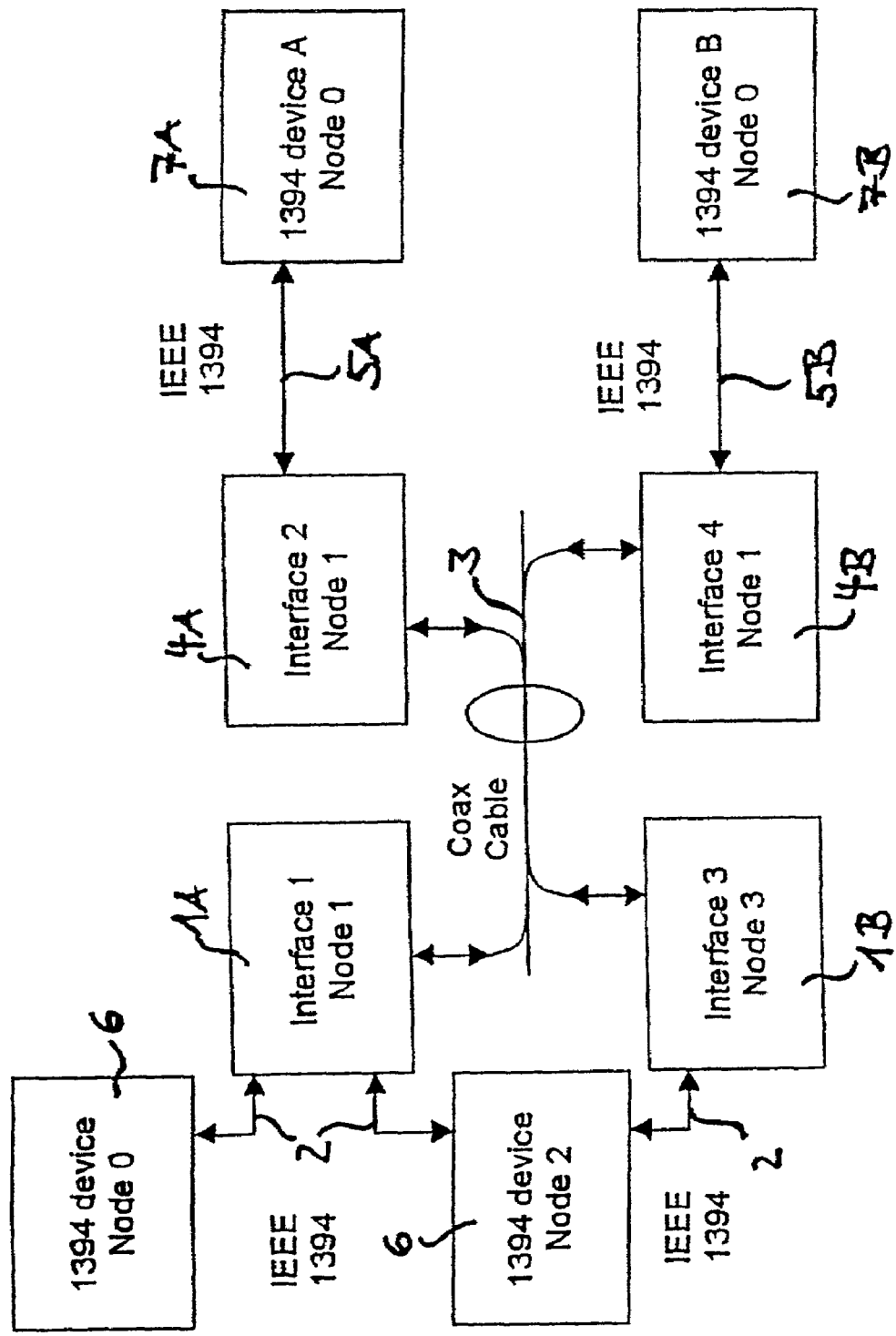
FIG. 11 shows another simplified distributed network using a coaxial cable.

Of course, this embodiment to "hide" the coaxial interface is not limited to a distributed network with only one pair of coaxial interfaces. FIG. 11 shows an example where two separate single remote nodes 7A, 7B are connected to a coaxial cable network 3. To achieve such a "hiding" of two separate single remote nodes two first interface link layer devices 1A, 1B are required on the multidevice side, i. e. connected to the first IEEE1394 serial bus 2, which respectively communicate with a corresponding second interface link layer device 4A, 4B through the coaxial cable 3 which is in turn connected to a respective single remote node 7A, 7B through a respective second IEEE1394 serial bus 5A, 5B.

As described in EP 0 848 568 A1 there are different solutions for the transmission of digital data via the coaxial cable, e. g. as a QPSK or a QAM-signal, of course, all these and other methods can be applied to an interface link layer device according to the present invention.

Figure 13:
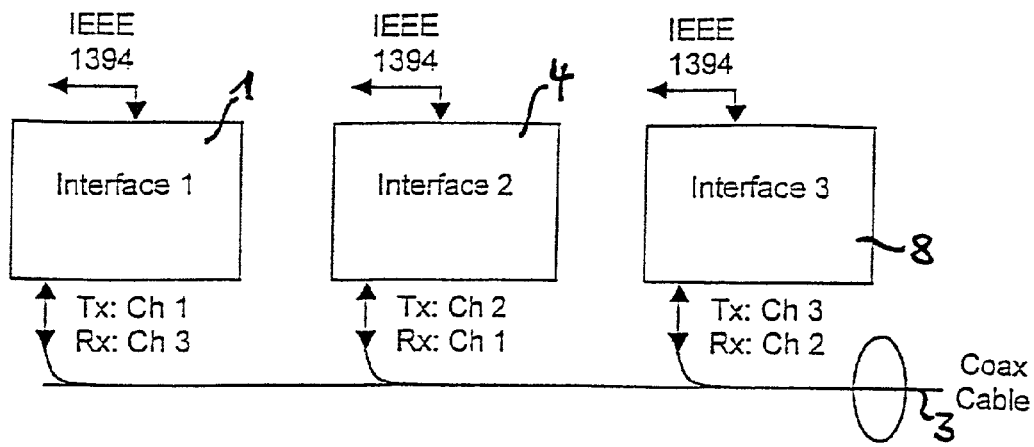
FIG. 13 shows a ring channel assignment of a distributed network with three connected IEEE1394 serial busses.
Figure 14:
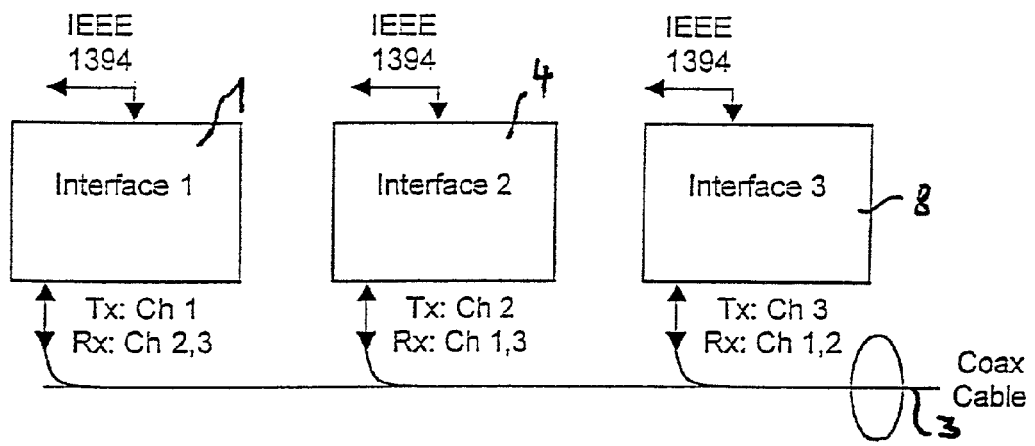
FIG. 14 shows a semi-hyper cube channel assignment of a distributed network with three connected IEEE1394 serial busses.
Figure 15:
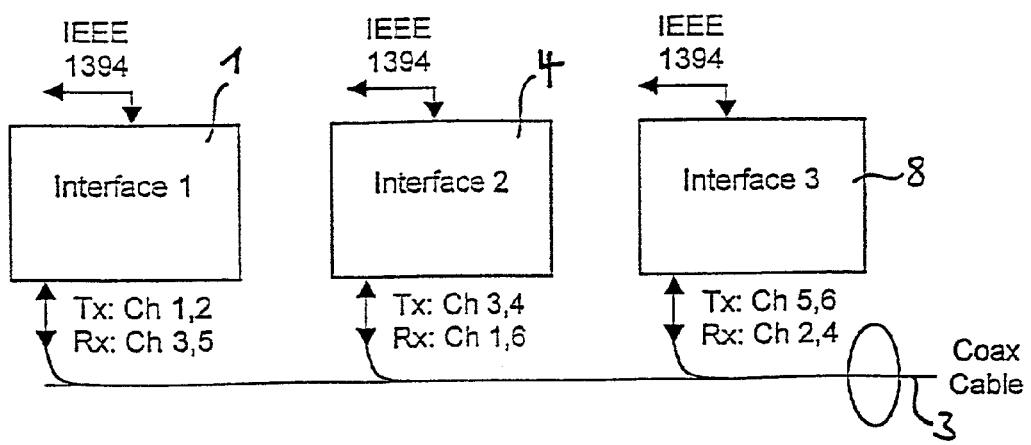
FIG. 15 shows a full-hyper cube channel assignment of a distributed network with three connected IEEE1394 serial busses.
Figure 16:
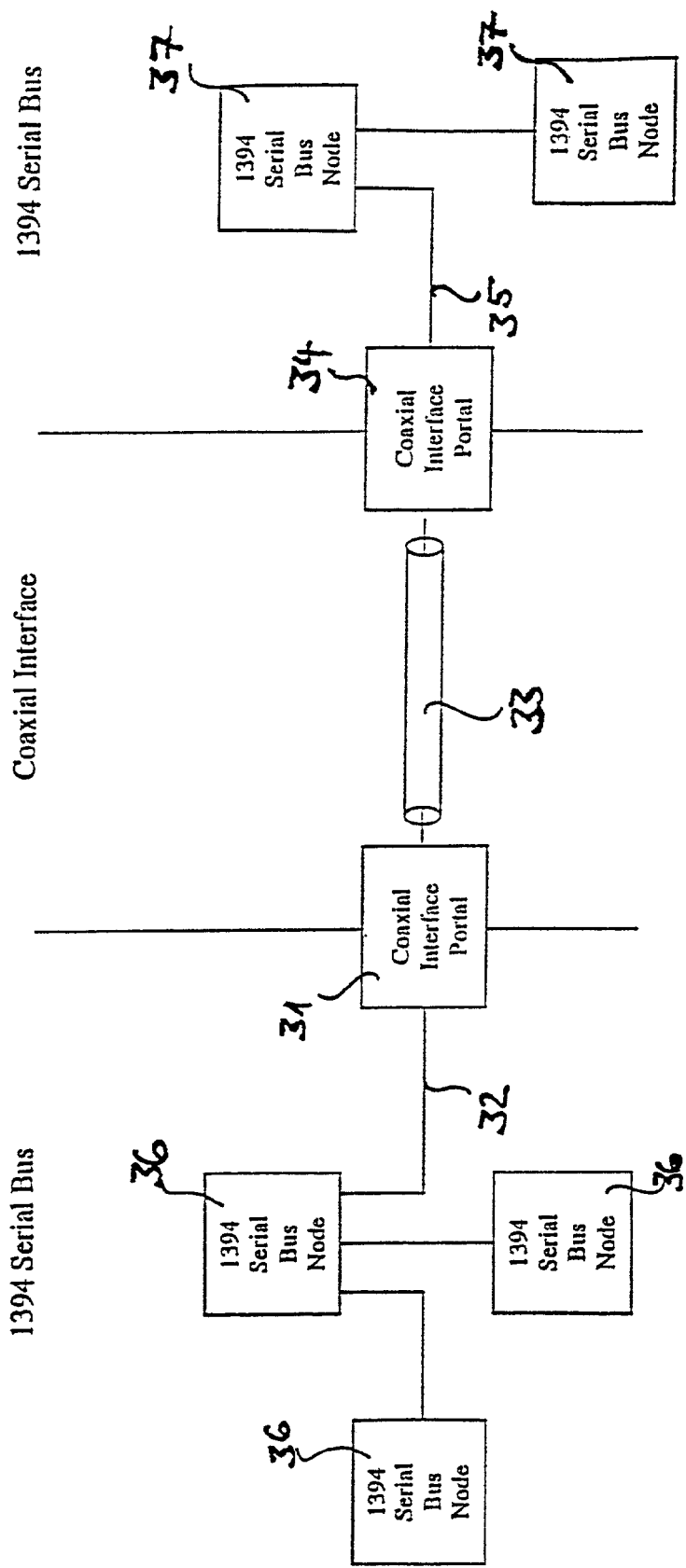
FIG. 16 shows a distributed network with two IEEE1394 serial busses connected via a coaxial interface according to the prior art.
Figure 17:
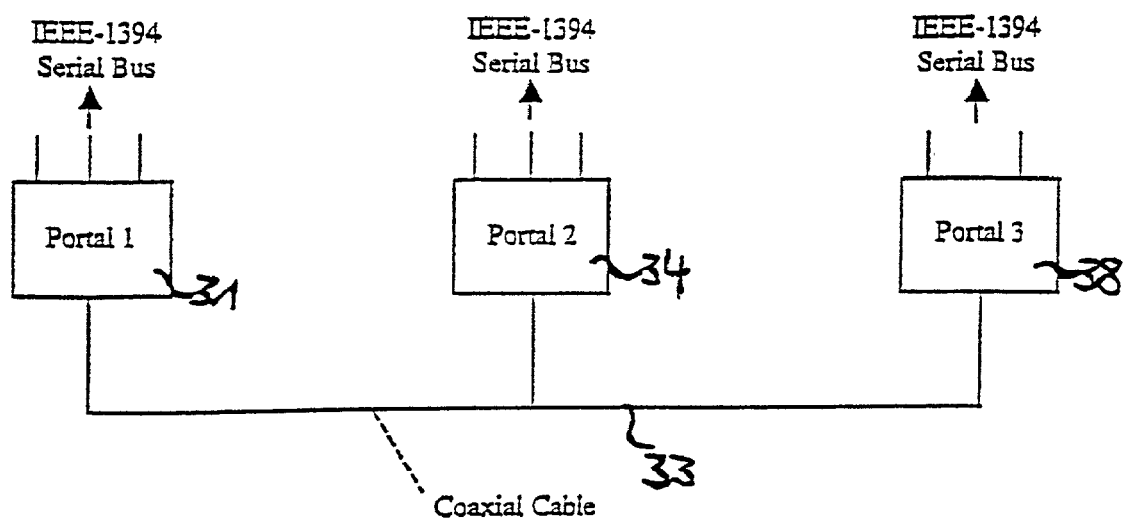
FIG. 17 shows the interface part of a distributed network with three IEEE1394 serial busses that are interconnected via a coaxial interface according to the prior art.

FIGS. 13 to 15 show that more than two interface link layer devices can be connected to the coaxial cable 3 similar to the distributed prior art network shown in FIG. 17. It is shown that three interface link layer devices are connected to one coaxial cable 3, namely a first interface link layer device 1, a second interface link layer device 4 and a third interface link layer device 8. Every interface link layer device is also connected to a respective IEEE1394 serial bus and each of these IEEE1394 serial busses has been assigned a different bus identifier.

According to the present invention a bi-directional communication between all busses is enabled and data that is not needed on a certain IEEE1394 serial bus will not be seen there. As stated above within the coaxial cable or a coaxial network consisting of several coaxial cables channels are assigned in frequency division multiplex with every channel occupying a certain bandwidth so that a large number of channels is simultaneously available.

Figure 12:
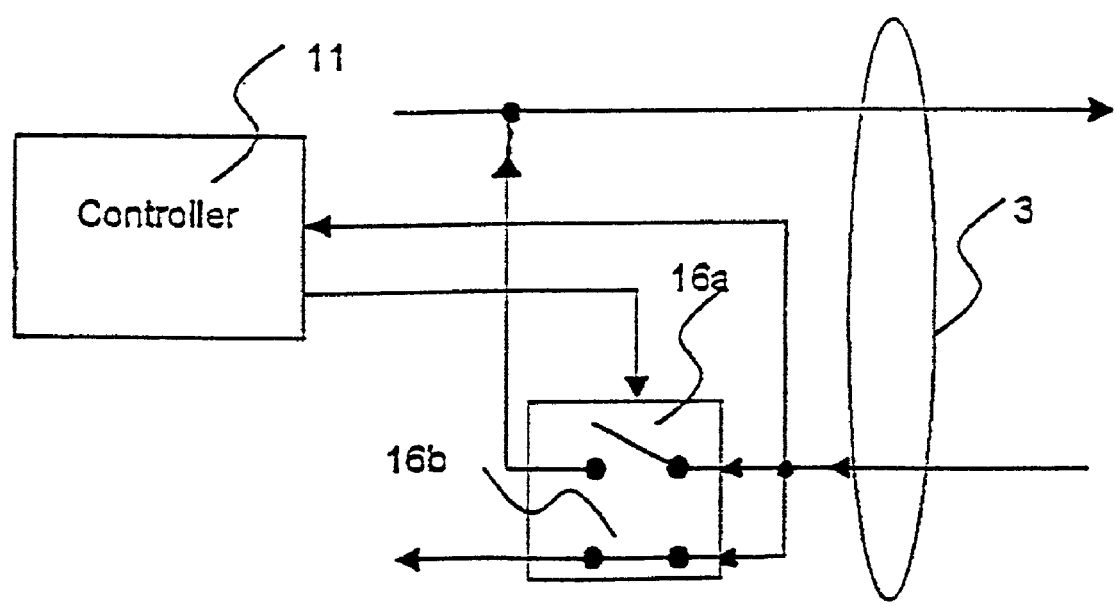
FIG. 12 shows an additional function unit for an interface link layer device according to the present invention.

In order to achieve availability of the data packets within the coaxial cable 3 to all interface link layer devices while not setting-up two channels between every possible pair of interface link layer devices, i. e. while not setting-up a full-hyper-cube channel assignment as shown and described in connection with FIG. 15, but setting-up e. g. a ring channel assignment, while not generating superfluous bus traffic on the attached IEEE1394 serial busses, an additional function unit as shown in FIG. 12 and described in the following can be implemented inside an interface link layer device according to the present invention.

The downstream path from the coaxial cable 3 to the interface link layer device and the upstream path from the interface link layer device to the coaxial cable 3 can be connected if necessary by a first additional switch 16a which is controlled by the controller 11 which is additionally connected to the downstream path. Asynchronous IEEE1394 packets taking this route will not be seen on the IEEE1394 serial bus this interface link layer device is connected to, since a second additional switch 16b which is also controlled by the controller 11 and which connects the downstream path with the packet separator 20 is open in this case.

The controller 11 monitors the incoming downstream packets to control the first and second additional switches 16a and 16b according to the destination address of the packet. The switch position shown in FIG. 12 in which the first additional switch 16a is open and the second additional switch 16b is closed indicates the case when a packet is destined to the IEEE1394 serial bus this interface link layer device is a member of. As described above, the first additional switch 16a will close and the second additional switch 16b will open for packets destined to other bus numbers.

In case of isochronous packets, it is possible to send these both to the IEEE1394 serial bus the interface link layer device is connected to and through the upstream path to the next or other interface link layer devices on the coaxial cable 3. In this case both additional switches 16a and 16b are closed.

Of course, such a functionality can alternatively also be included in the packet separator 20 which needs then a connection to the upstream path, e.g. directly or via the packetizer 13, and in order to know how to distribute the received packets also to the controller 11.

FIG. 13 shows a ring channel assignment for the distributed IEEE1394 serial bus network according to which the data links between all the interface link layer devices connected to the coaxial cable 3 are arranged in a ring. For the ring channel assignment every interface requires one transmission and one reception channel. In FIG. 13 the first interface link layer device 1 transmits on channel 1 and receives on channel 3, the second interface link layer device 4 transmits on channel 2 and receives on channel 1 and the third interface link layer device 8 transmits on channel 3 and receives on channel 2. For n interfaces n channel on the coaxial cable are required. With this channel assignment there is no need to re-configure the data links on the coaxial cable 3 on the fly.

FIG. 14 shows a semi-hyper-cube channel assignment for the distributed IEEE1394 serial bus network which assures a data link from every interface link layer device to every other interface link layer device. To save channels every interface link layer device transmits on just one channel via the coaxial cable 3 and reception is done on all the other channels used for transmission by the other interface link layer devices. In FIG. 14 the first interface link layer device 1 transmits on channel 1 and receives on channels 2 and 3, the second interface link layer device 4 transmits on channel 2 and receives on channels 1 and 3 and the third interface link layer device 8 transmits on channel 3 and receives on channels 1 and 2.

For such a semi-hyper-cube channel assignment every interface link layer device requires one transmission and (n−1) reception channels in case of n interface link layer devices. Therefore, n channels on the coaxial network are required. If said data links are desired, one interface link layer device must have (n−1) front end modules. Therefore, it is desirable to have a dynamic channel assignment scheme.

FIG. 15 shows the full-hyper-cube channel assignment for the distributed IEEE1394 serial bus network which assures a data link from every interface link layer device to every other interface link layer device. In the full-hypercube channel assignment one transmission and one reception channel are set up inbetween each two interface link layer devices. Therefore, the additional functionality of the interface link layer device 1 as shown in FIG. 12 and described in connection therewith is not necessary. In FIG. 15 the first interface link layer device 1 transmits on channel 1 to the second interface link layer device 4 and on channel 2 to the third interface link layer device 8, and receives on channel 3 from the second interface link layer device 4 and on channel 5 from the third interface link layer device 8. The second interface link layer device 4 transmits on channel 3 to the first interface link layer device 1 and on channel 4 to the third interface link layer device 8, and receives on channel 1 from the first interface link layer device 1 and on channel 6 from the third interface link layer device 8. The third interface link layer device 8 transmits on channel 5 to the first interface link layer device 1 and on channel 6 to the second interface link layer device 4, and receives on channel 2 from the first interface link layer device and on channel 4 from the second interface link layer device 4.

In a distributed network with n interface link layer devices every interface link layer device requires (n−1) transmission and (n−1) reception channels. Therefore, for n interface link layer devices n·(n−1) channels on the coaxial cable 3 are required.

The invention claimed is:

1. Interface link layer device connected to a first data bus and via a transmission path to at least one other interface link layer device that is connected to a respective second data bus of a plurality of second data busses, comprising:

uplink means to accept a data packet from the first data bus that has a predetermined destination or that has a channel number of a data channel that leads from the first data bus to one of said respective second data bus and to transmit it via said transmission path to said other interface link layer device serving said predetermined destination; and downlink means to output data packets received via said transmission path from one of said at least one other interface link layer device to a predetermined destination on the first data bus, wherein said uplink means comprise a first register that reflects destination identifiers which will be accepted, wherein said destination identifier is a bus identifier of said respective second data bus and said first register comprises a bus enable register identifying said respective second data bus that is serving said predetermined destinations, and wherein said uplink means comprises a packetizer that is able to repack data packets received from the first data bus into a format of the transmission path that is different to the format of the first data bus.

2. Interface link layer device connected to a first data bus and via a transmission path to at least one other interface link layer device that is connected to a respective second data bus of a plurality of second data busses, comprising:

uplink means to accept a data packet from the first data bus that has a predetermined destination or that has a channel number of a data channel that leads from the first data bus to one of said respective second data bus and to transmit it via said transmission path to said other interface link layer device serving said predetermined destination; and downlink means to output data packets received via said transmission path from one of said at least one other interface link layer device to a predetermined destination on the first data bus, wherein said uplink means comprise a first register that reflects destination identifiers which will be accepted, wherein said destination identifier is a bus identifier of said respective second data bus and said first register comprises a bus enable register identifying said respective second data bus that is serving said predetermined destinations, and wherein said downlink means comprises a packet separator that is able to repack data packets received from the transmission path into a format of the first data bus that is different to the format of the transmission path.

3. Interface link layer device connected to a first data bus and via a transmission path to at least one other interface link layer device that is connected to a respective second data bus of a plurality of second data busses, comprising:

uplink means to accept a data packet from the first data bus that has a predetermined destination or that has a channel number of a data channel that leads from the first data bus to one of said respective second data bus and to transmit it via said transmission path to said other interface link layer device serving said predetermined destination;

downlink means to output data packets received via said transmission path from one of said at least one other interface link layer device to a predetermined destination on the first data bus; and an acknowledge code generator that generates an acknowledgement to be send to the originator of a data packet accepted from the data bus it is connected to and transmitted via said transmission path to a predetermined destination different to itself.

4. Interface link layer device according to claim 3, wherein said acknowledgement indicates a pending action in case data packet is forwarded to another predetermined destination.

5. Interface link layer device according to claim 3, wherein said acknowledgement indicates a completed action in case a data packet was forwarded to another predetermined destination and said other destination returns a response packet without any errors.

6. Interface link layer device according to claim 3, wherein said acknowledgement indicates an error in case of a data reception error.

7. Interface link layer device connected to a first data bus and via a transmission path to at least one other interface link layer device that is connected to a respective second data bus of a plurality of second data busses, comprising:

uplink means to accept a data packet from the first data bus that has a predetermined destination or that has a channel number of a data channel that leads from the first data bus to one of said respective second data bus and to transmit it via said transmission path to said other interface link layer device serving said predetermined destination;

downlink means to output data packets received via said transmission path from one of said at least one other interface link layer device to a predetermined destination on the first data bus; and a response packet generator that generates a response to be send via the transmission path to the destination of an acknowledge code received via said first data bus.

8. Interface link layer device according to claim 7, wherein said response indicates a completed action in case a completed action acknowledge code is received.

9. Interface link layer device according to claim 7, wherein no response is sent in case a pending action acknowledge code is received.

10. Interface link layer device according to claim 7, wherein said response indicates a busy destination in case a busy acknowledge code is received.

11. Interface link layer device according to claim 7, wherein said response indicates a data error in case a data error acknowledge code is received.

12. Interface link layer device according to claim 7, wherein said response indicates a type error in case a type error acknowledge code is received.

13. Interface link layer device according to claim 7, wherein said response packet generator monitors the request packets output to the first data bus to generate the response packet.

* * * * *